(12) United States Patent
Green

(10) Patent No.: US 6,969,104 B2
(45) Date of Patent: Nov. 29, 2005

(54) ADJUSTABLE LENGTH CHASSIS

(76) Inventor: Charles T. Green, 3018 Willow Pass Rd., Concord, CA (US) 94519

( * ) Notice: Subject to any disclaimer, the term of this patent is extended or adjusted under 35 U.S.C. 154(b) by 0 days.

(21) Appl. No.: 10/920,238

(22) Filed: Aug. 18, 2004

(65) Prior Publication Data
US 2005/0057059 A1    Mar. 17, 2005

Related U.S. Application Data

(60) Provisional application No. 60/502,977, filed on Sep. 16, 2003.

(51) Int. Cl.$^7$ ............................................. B62D 53/06
(52) U.S. Cl. ............................... 296/26.09; 296/184.1; 280/656
(58) Field of Search .......................... 296/26.08, 26.09, 296/184.1, 204; 280/656, 404, 407.1, 789, 280/441.2, 142, 425.2, 149.2; 298/17 R, 298/22 R

(56) References Cited

U.S. PATENT DOCUMENTS

| | | | |
|---|---|---|---|
| 2,119,800 A | * | 6/1938 | Tull |
| 3,508,762 A | | 4/1970 | Pratt |
| 4,397,476 A | | 8/1983 | Bolyard et al. |
| 4,478,547 A | | 10/1984 | Den Boer |
| 4,561,671 A | | 12/1985 | De Witt et al. |
| 4,566,714 A | | 1/1986 | De Witt et al. |
| 4,580,805 A | | 4/1986 | Bertolini |
| 4,635,742 A | * | 1/1987 | Bertolini |
| 4,877,293 A | * | 10/1989 | French et al. |
| 4,958,845 A | | 9/1990 | Parks |
| 5,042,831 A | | 8/1991 | Kuhns |
| 5,183,371 A | | 2/1993 | O'Daniel |
| 5,794,960 A | | 8/1998 | Sill et al. |
| 6,478,324 B1 | | 11/2002 | Yurgevich |

* cited by examiner

Primary Examiner—Stephen Gordon
(74) Attorney, Agent, or Firm—Richard C. Litman

(57) ABSTRACT

The adjustable length chassis is a modified 53-foot chassis that is capable of being reduced in length to fit inside of a conventional 53-foot shipping container. The chassis is constructed of two main elements, which are the forward gooseneck assembly and the rear frame assembly. The forward gooseneck assembly and the rear frame assembly each comprise a pair of spaced apart side rails having an "I" beam cross section. The side rails of the rear frame assembly have "U" shaped channel bars welded into their "I" beams to form a channel in the front portion of the rear frame assembly. The channel is of sufficient length to allow the gooseneck assembly to slide into the rear frame assembly and reduce the overall length of the chassis by 24 to 36 inches so that the chassis may fit inside of a conventional 53 foot shipping container.

17 Claims, 10 Drawing Sheets

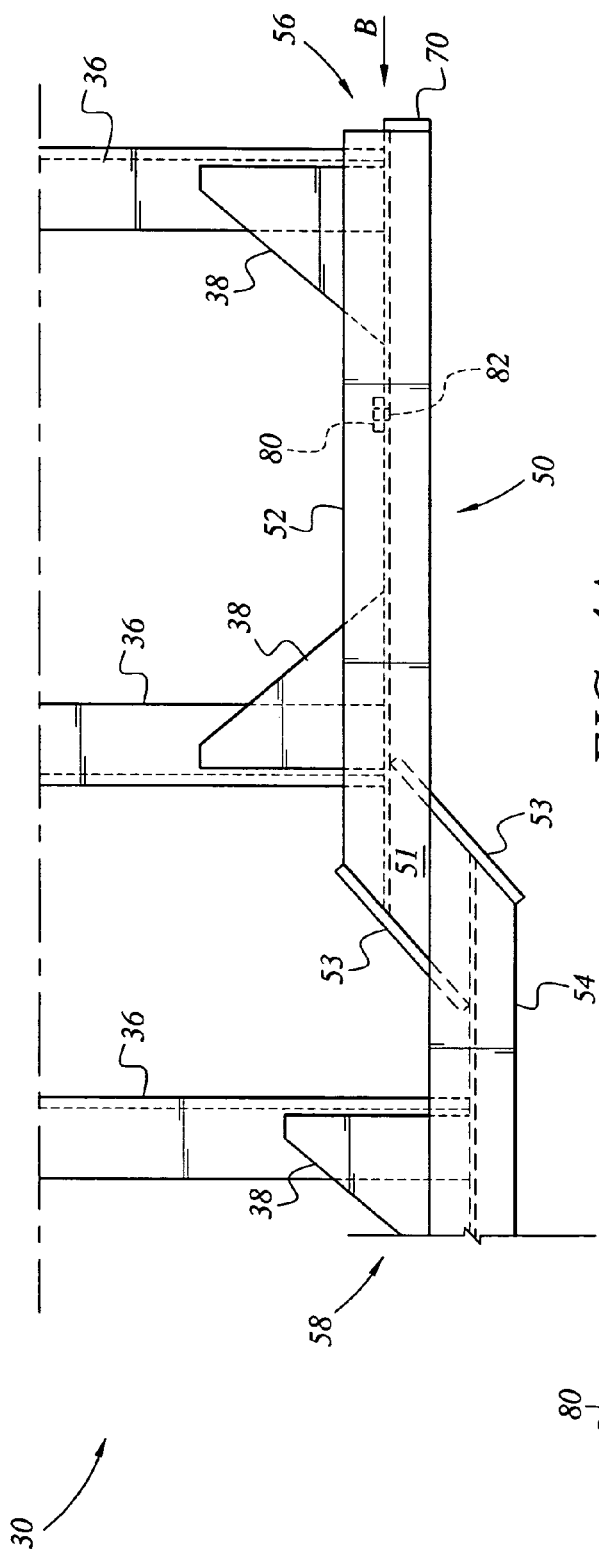
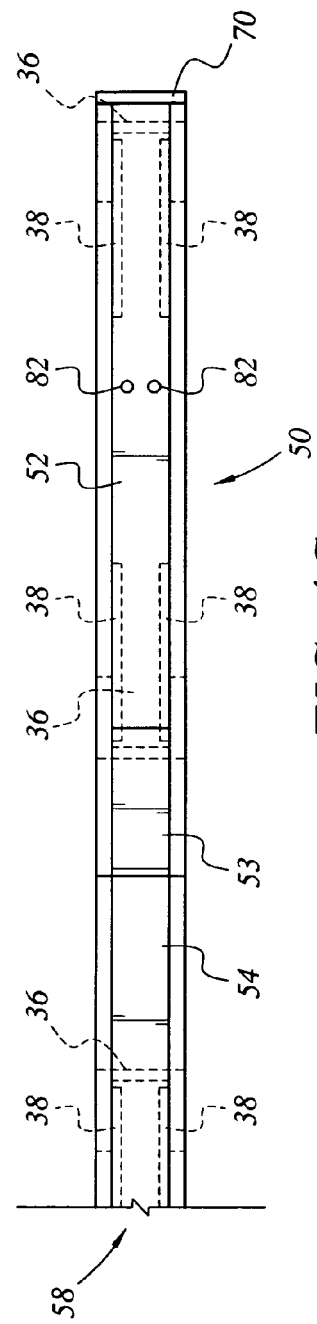
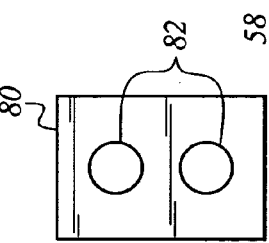
FIG. 4A
FIG. 4B
FIG. 4C

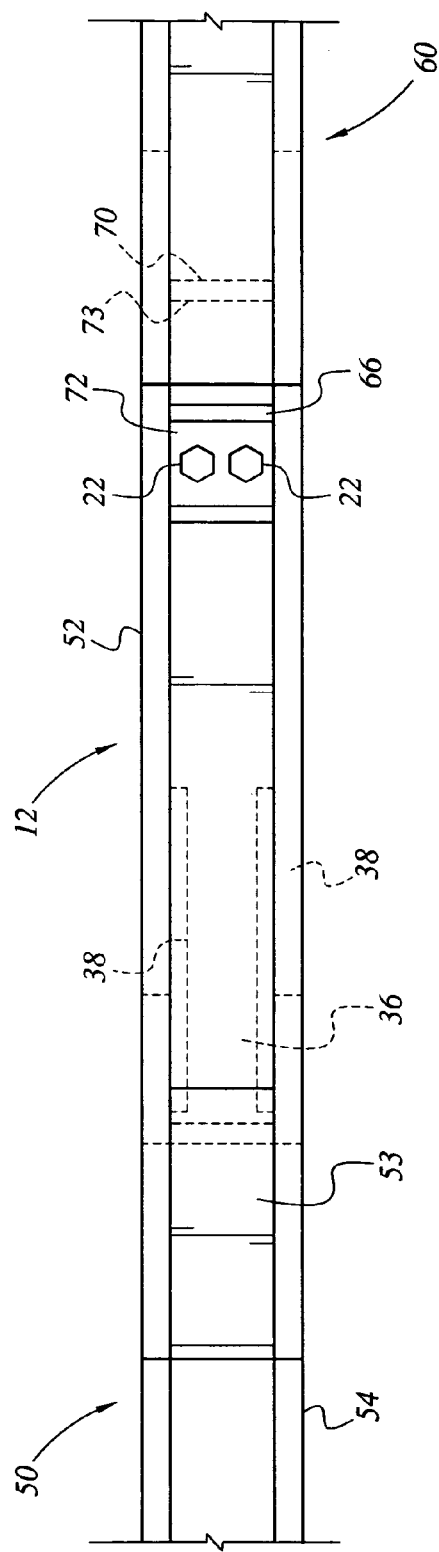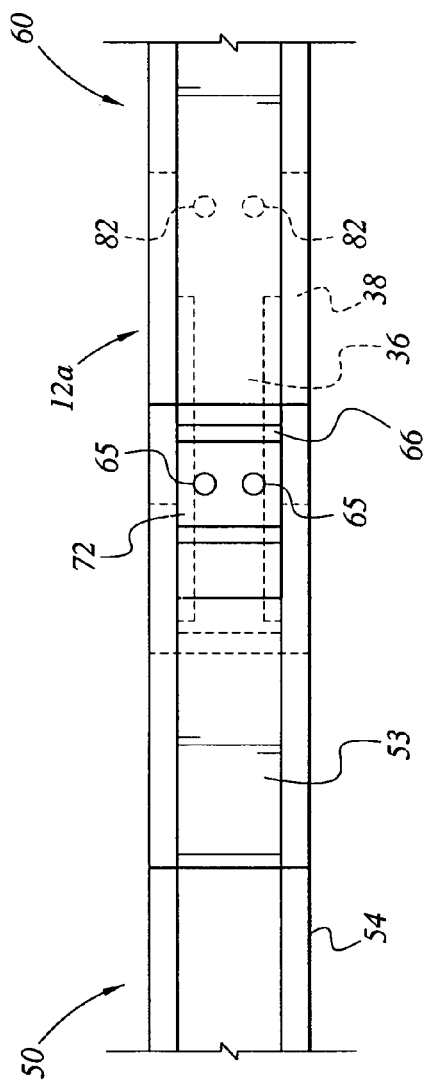
FIG. 10
FIG. 11

ADJUSTABLE LENGTH CHASSIS

CROSS-REFERENCE TO RELATED APPLICATION

This application claims the benefit of U.S. Provisional Patent Application Ser. No. 60/502,977, filed Sep. 16, 2003.

BACKGROUND OF THE INVENTION

1. Field of the Invention

The present invention relates to devices for reducing and expanding the length of a trailer chassis, and more particularly to a 53-foot chassis that may be reduced in length to fit inside of a standard 53 foot shipping container.

2. Description of the Related Art

Shipping containers are typically used for shipping goods a long distance while preventing damage to the goods. Conventional shipping containers are referred to as 53-foot containers, although their actual length is only 52 feet and 6 inches. A conventional trailer chassis is referred to as a 53-foot chassis, although its actual length is 53 feet and 11 inches. Because the length of the trailer chassis is greater than the length of the shipping containers the opportunity to ship chassis inside of shipping containers does not presently exist. What is needed is a trailer chassis that can be reduced in length to fit inside of a conventional shipping container to eliminate the costs of re-positioning the containers and chassis. Several length adjustable trailer chassis are in existence. The following patent documents disclose examples of adjustable trailer chassis.

U.S. Pat. No. 6,478,324 issued on Nov. 12, 2002 to Yurgevich, H. J. discloses a variable height gooseneck. The device is an adjustable chassis for transporting shipping containers of different configurations. The chassis comprises at least two spaced-apart frame members having upper surfaces for supporting a shipping container. At least two conversion members are pivotally mounted to the chassis by at least two translation members. The conversion members are configured to move from a storage position to a deployed position. The adjustable chassis modifies the height of the gooseneck to accommodate the varying tunnel heights of the different standard shipping containers.

U.S. Pat. No. 5,794,960 issued on Aug. 18, 1998 to Sill et al. discloses a chassis with convertible gooseneck. The gooseneck is adjustable and can be raised or lowered to change its effective height to accommodate containers having different tunnel depths. The gooseneck includes a pair of rails that are pivotable to present alternative tunnel support surfaces.

U.S. Pat. No. 5,183,371 issued on Feb. 2, 1993 to O'Daniel, H. W. discloses an extendable rolloff trailer. The trailer includes an extendable frame having a rear portion that is telescopingly engaged by the main trailer frame and having a front portion that is engaged with a tractor for pulling the trailer. A tilt frame is mounted to on an upper surface of the main trailer frame. By locking the front of the container to the extendable frame, the frame can be extended to redistribute the container load toward the center of the extended trailer.

U.S. Pat. No. 5,042,831 issued on Aug. 27, 1991 to Kuhns, A. B. discloses an adjustable length chassis. The chassis has front and rear reach beams and a center beam. The center beam is telescopically slideable into the reach beams and one of the reach beams is telescopically slideable into the other reach beam to attain minimum length adjustments of the chassis.

U.S. Pat. No. 4,958,845 issued on Sep. 25, 1990 to Parks, D. J. discloses an extendable trailer apparatus. The apparatus includes a fixed frame and a frame slideably connected to the fixed frame for lengthening and shortening the trailer apparatus. The two frames are movable for adjusting the weight of the load on the trailer axles.

U.S. Pat. No. 4,580,805 issued on Apr. 8, 1986 to Bertolini, W. A. discloses an extendable container chassis for trucks. The extendable truck trailer chassis has a movable rear section or extension. The extension has a gear rack whose teeth are adapted to mesh with teeth of an idler pinion that is mounted on the main frame and is engaged with a similar gear rack on a cradle on the chassis.

U.S. Pat. No. 4,566,714 issued on Jan. 28, 1986 and U.S. Pat. No. 4,561,671 issued on Dec. 31, 1985 to De Witt et al. disclose a universal chassis for hauling containers. The universal chassis can accommodate shipping containers of varying lengths. The wheel assemblies of the trailer are coupled to one another by an elongate extensible stinger that is readily adjusted in extent to bring the wheel assemblies closer together for shorter containers and to space the wheel assemblies further apart for longer containers.

U.S. Pat. No. 4,478,547 issued on Oct. 23, 1984 to Den Boer, L. A. discloses a bale handling apparatus. The apparatus includes a frame portion having a first bed section and a second bed section that is telescoping with respect to the first bed section to adjust the length of the frame portion.

U.S. Pat. No. 4,397,476 issued on Aug. 9, 1983 to Bolyard et al. discloses a collapsible trailer. The trailer comprises an elongate central member and a pair of opposite end transverse members. The elongated central member is longitudinally extendible and retractable.

U.S. Pat. No. 3,508,762 issued on Apr. 28, 1970 to Pratt, R. A. discloses an adjustable container chassis. The wheeled chassis is adjustable to accept different sizes of containers by adjusting the length of the chassis. The chassis comprises an elongate frame, an undercarriage movable along the frame, a movable bolster on the frame for supporting the container and a latching means that permits the selective movement of either the undercarriage of the bolster.

None of the above inventions and patents, taken either singly or in combination, is seen to describe the instant invention as claimed. Thus an adjustable length chassis solving the aforementioned problems is desired.

SUMMARY OF THE INVENTION

The adjustable length chassis is a modified 53-foot chassis that is capable of being reduced in length to fit inside of a conventional 53-foot shipping container. The chassis is constructed of two main elements, which are the forward gooseneck assembly and the rear frame assembly. The forward gooseneck assembly and the rear frame assembly each comprise a pair of spaced apart side rails and a plurality of cross bars disposed across the space between the side rails. Each of the side rails has an "I" beam cross section.

The space between the side rails of the gooseneck assembly is reduced at the end adjacent to the rear frame assembly. The overall width of the gooseneck assembly is therefore reduced at the end adjacent to the rear frame assembly. The side rails of the rear frame assembly have a "U" shape channel welded into their "I" beams to form a protrusion in the front portion of the rear frame assembly. The portion of the gooseneck assembly having the reduced width is adapted to slidingly engage the protrusion formed in the rear frame assembly. The "U" shaped protrusion is of sufficient length to allow the gooseneck assembly to slide into the rear frame assembly and reduce the overall length of the chassis by 24 inches so that the chassis may fit inside of a conventional 53-foot shipping container.

One end of the side rails on the rear frame assembly is equipped with a pair of bolt receiving holes. The side rails of the gooseneck assembly each have a bolt block welded to the inside wall of the "I" beam. Bolt receiving holes are drilled through both the bolt blocks and the inside wall or "I" portion of the "I" beam. The bolt holes on the rear frame assembly line up with the holes on the bolt blocks to receive a plurality of securing bolts. The securing bolts lock the gooseneck assembly and the rear frame assembly together when the chassis is in the extended position. The adjustable length chassis has a locking mechanism that prevents the front portion and the rear portion of the chassis from completely separating when extended into its full-length position.

It is an aspect of the invention to provide improved elements and arrangements thereof for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

FIG. 4A is a plan view of one half of the gooseneck assembly of the adjustable length chassis.

FIG. 4B is a front view of the bolt block of the gooseneck assembly.

FIG. 4C is a side elevation view of the gooseneck assembly of FIG. 4A.

FIG. 10 is a detail side elevation view of the gooseneck trombone portion of the chassis extended as in FIG. 2A.

FIG. 11 is a detail side elevation view of the gooseneck trombone portion of the chassis contracted as in FIG. 2B.

Similar reference characters denote corresponding features consistently throughout the attached drawings.

DETAILED DESCRIPTION OF THE PREFERRED EMBODIMENTS

The present invention is an adjustable length chassis that allows the overall length of a trailer to be reduced to fit the trailer inside of a conventional shipping container.

Figure 1:
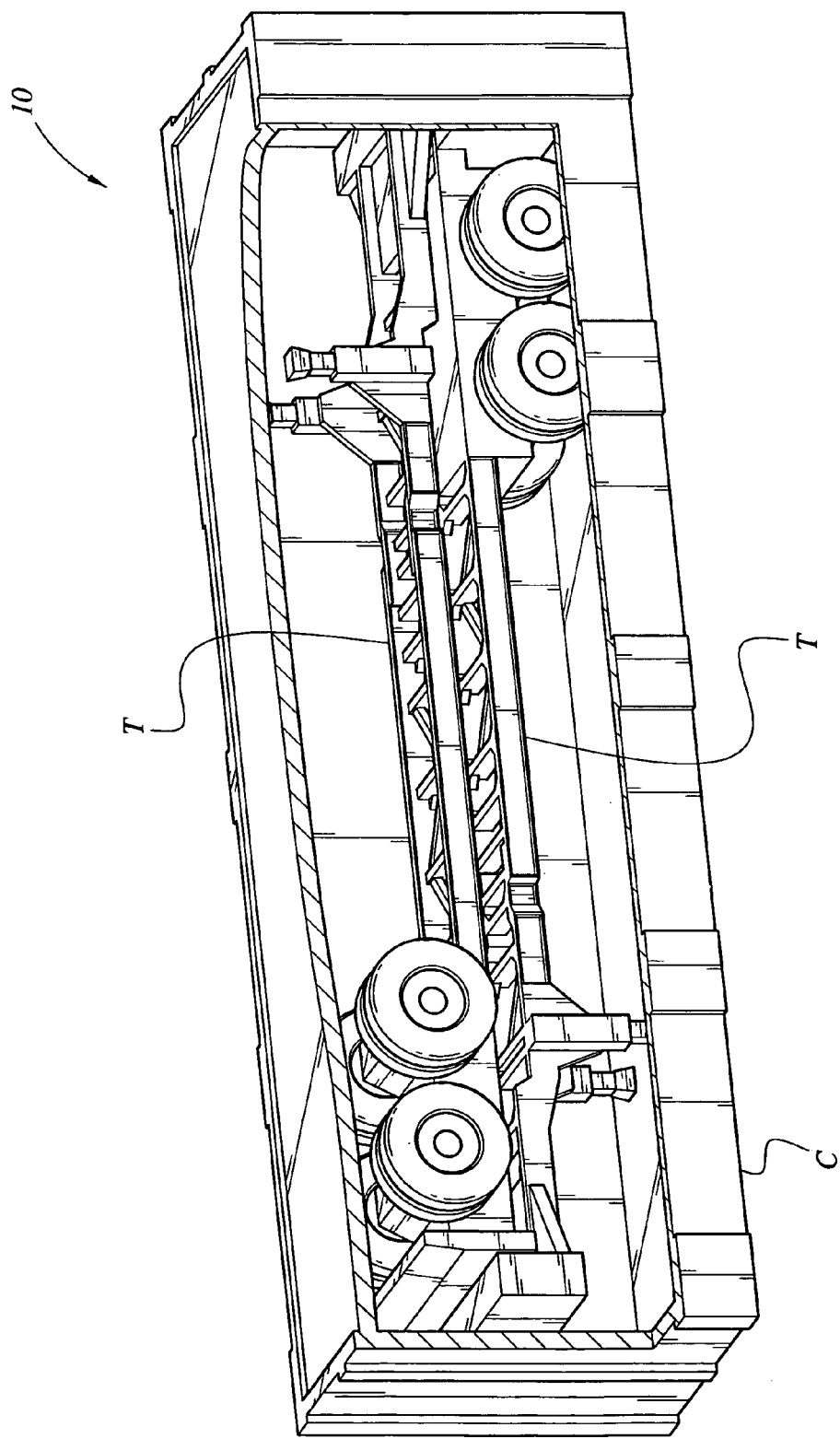
FIG. 1 is an environmental, perspective view of two trailers having an adjustable length chassis according to the present invention, the trailers being stacked and transported in a shipping container.

FIG. 1 is an environmental perspective view of two trailers T, each having an adjustable length chassis 10, stacked and positioned inside of a conventional shipping container C. Conventional shipping containers C are referred to as 53-foot containers, although they actually have a length of 52 feet and 6 inches. Typical trailer chassis are referred to as 53-foot chassis, while their actual length is 53 feet 11 inches. The adjustable length chassis 10 provides a chassis they may be reduced in length to fit inside of a 53-foot shipping container C.

Figure 2A:
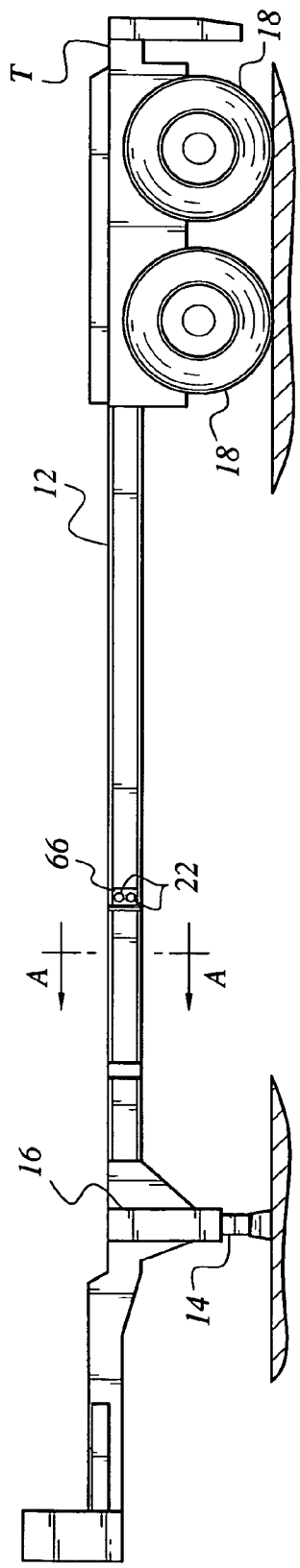
FIG. 2A is side view of the adjustable length chassis in the extended position.
Figure 2B:
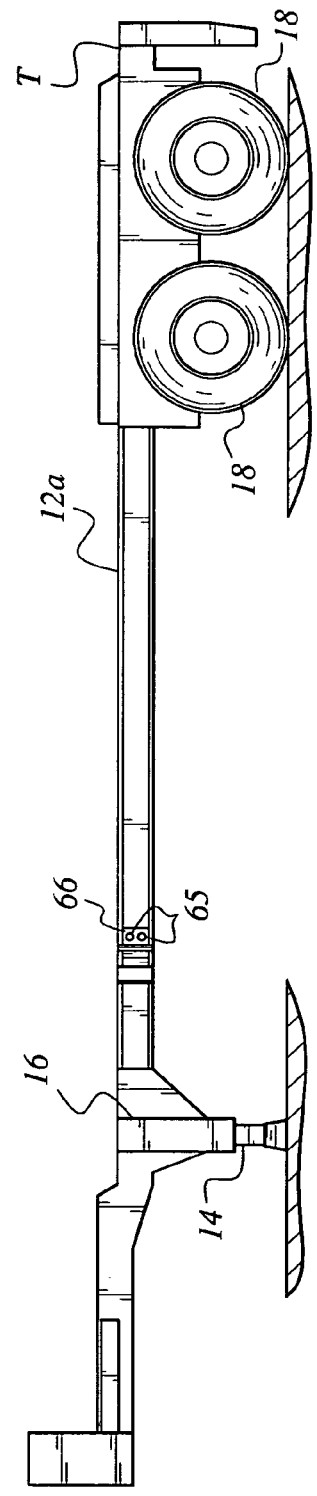
FIG. 2B is a side view of the adjustable length chassis in the contracted position.

FIGS. 2A and 2B depict the trailer T having an adjustable length chassis 10. The trailer T also has a plurality of wheels 18 disposed at a rear end of the trailer T and a landing gear 14 secured to the opposite end of the trailer T by a landing gear bracket 16. The trailer T shown in FIG. 2A is shown having a full-length chassis 12. The trailer in FIG. 2B is shown having a reduced length chassis 12a. The difference in length between the extended chassis 12 and the reduced length chassis 12a is preferably in the range of 2 to 2.5 feet. Angled end plate 66 of the rear frame is shown with connecting bolts 22 in place in the extended chassis 12. Angled end plate 66 of the rear frame is shown in the contracted position relative to the gooseneck(see below) with empty upper and lower bolt receiving holes 65 in contracted chassis 12a.

Figure 3:
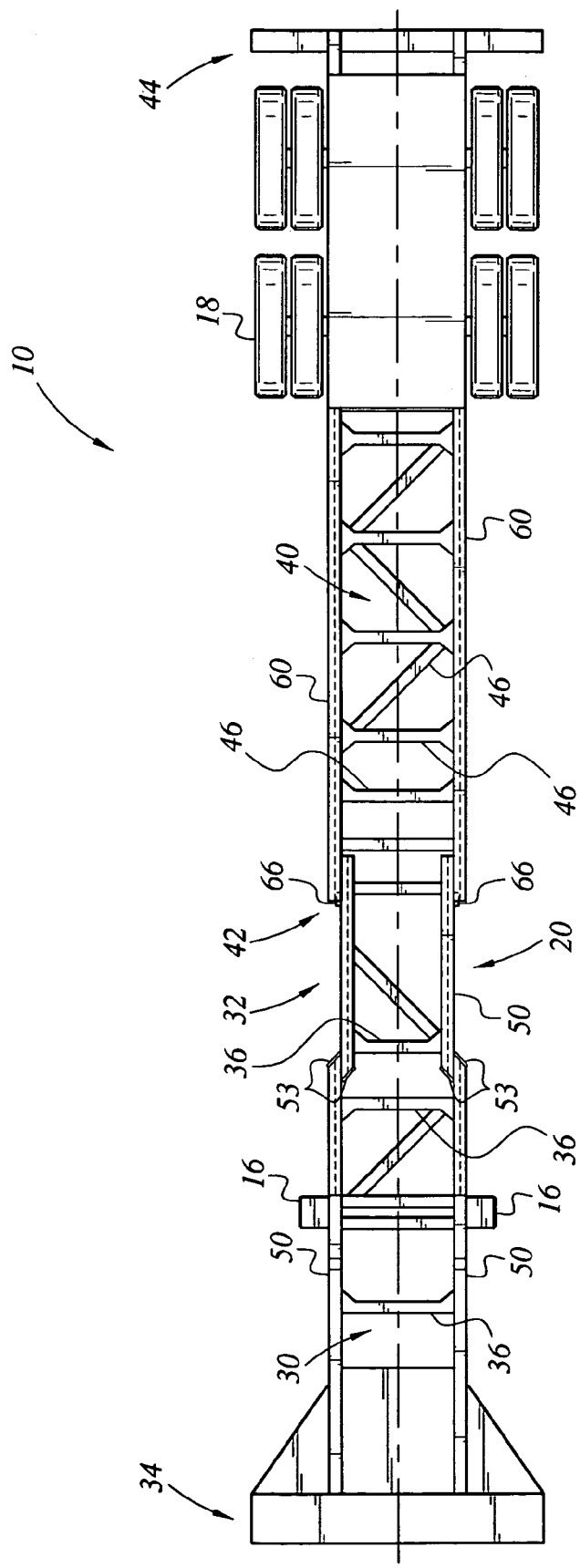
FIG. 3 is a plan view of the adjustable length chassis.

FIG. 3 is a plan view of the adjustable length chassis 10. The adjustable length chassis 10 comprises two main elements, the forward gooseneck assembly 30 and the rear frame assembly 40. The forward gooseneck assembly 30 and the rear frame assembly 40 are slideably engaged to one another at the trombone portion 20 of the adjustable length chassis 10.

The front gooseneck assembly 30 is a frame assembly for supporting a portion of the load being hauled on the chassis 10. The gooseneck assembly 30 has a non-engaging portion 34, positioned adjacent the front end of the chassis 10, and an engaging portion 32, positioned adjacent the trombone portion 20 of the chassis 10. The structure of the gooseneck assembly 30 comprises a pair of spaced apart side rails 50 having an overall length, and a plurality of cross bars 36 disposed across the space between the side rails 50.

The rear frame assembly 40 is a frame assembly for supporting a portion of the load being hauled on the chassis 10. The rear frame assembly has a non-engaging end 44, positioned adjacent the rear wheels 18 of the trailer T, and an engaging end 42 positioned ending in angled end plates 66 adjacent the trombone portion 20 of the chassis 10. The structure of the rear frame assembly 40 comprises a pair of spaced apart side main rails 60 and a plurality of cross bars 46 disposed across the space between the main rails 60. The cross bars 46, along with the cross bars 36 on the gooseneck assembly 30, define a bed portion for supporting the load being hauled on the chassis 10. The cross bars also provide lateral stability to the entire chassis 10.

FIG. 4A is plan view of one of the side rails 50 of the gooseneck assembly 30. Each side rail 50 is identical so discussion of only one side rail 50 is necessary. Each side rail 50 has a fixed end 58 and an engaging end 56, located adjacent the trombone portion 20 of the chassis 10. Each side rail also comprises an exterior portion 54, located adjacent the fixed end 58 of the rail 50, and an interior portion 52 (or extension beam), positioned adjacent the engaging end 56 of the side rail 50. The interior portion 52 of the side rail 50 begins adjacent the landing gear bracket (shown in FIG. 3). The interior portion 52 of the side rail 50 is positioned on the interior edge of the exterior portion 54. The interior portions 52 of the side rails 54 are spaced closer together than the exterior portions 54. This results in the engaging portion 32 of the gooseneck assembly 30 having a smaller width than the non-engaging end 34, so that the overall width of the gooseneck assembly 30 is reduced in the trombone portion 20 of the chassis 10.

According to the preferred embodiment of the present invention the overall width of the gooseneck assembly 30 is reduced from 40 inches to 31⅞ inches. The side rails 50 further comprise an end plate 53 on the ends of each portion 52, 54 of the side rails 50. Cross bars 36 with supporting gusset braces 38 extend inward from side rails 50. Bolt blocks 80 are welded to the inner wall or "I" portion of the interior portion 52 of side rail 50 and together define upper and lower fastener or bolt receiving holes 82 for attachment with the rear frame assembly 40 in the extended position.

FIG. 4b is a front view of the bolt block 80. Each bolt block 80 includes a pair of bolt receiving holes 82.

FIG. 4C is a side elevation view of a side rail of the gooseneck assembly 30 Of FIG. 4A. Outer member 54 and inner member 52 of side rail 50 are attached by end plates 53. Bolt receiving holes 82 are shown spaced from stopping plate 70.

Figure 5:
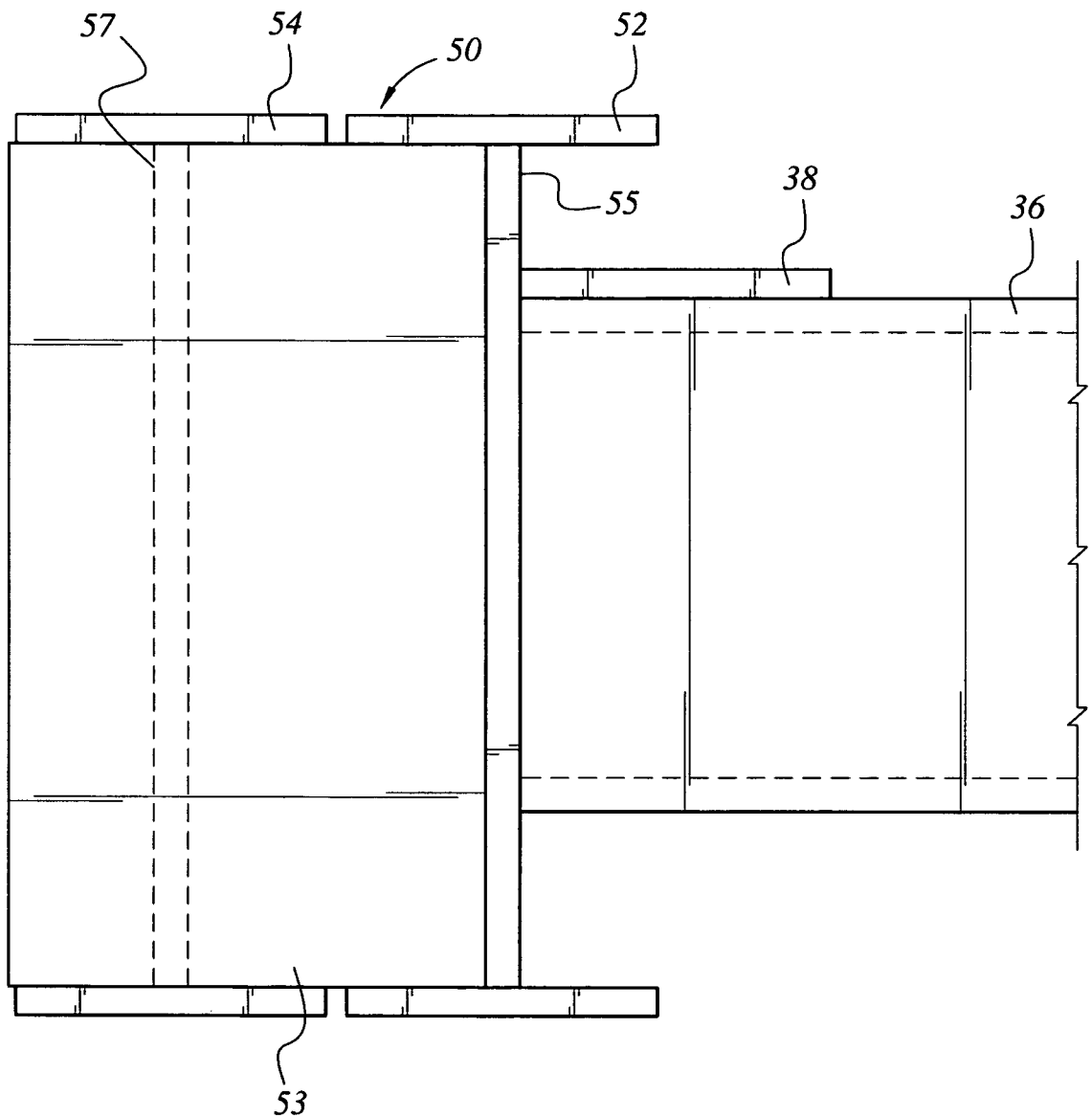
FIG. 5 is an end view of one of the rails of the gooseneck assembly.

FIG. 5 is an end view of the side rail 50 along the arrow B shown in FIG. 4A. The end view depicts the "I" beam structure 55 of the interior portion 52 of the side rail 50 and the "I" beam portion 57 of the exterior portion 54 of the side rail 50. The side rails also comprise a stopping plate 70 disposed on the engaging end 56 of each side rail 50. The stopping plate 70 is welded in place after assembly of the trombone portion 20 of gooseneck 30 and the rear frame assembly 40 and assures that the two assemblies do not separate upon extension.

Figure 6:
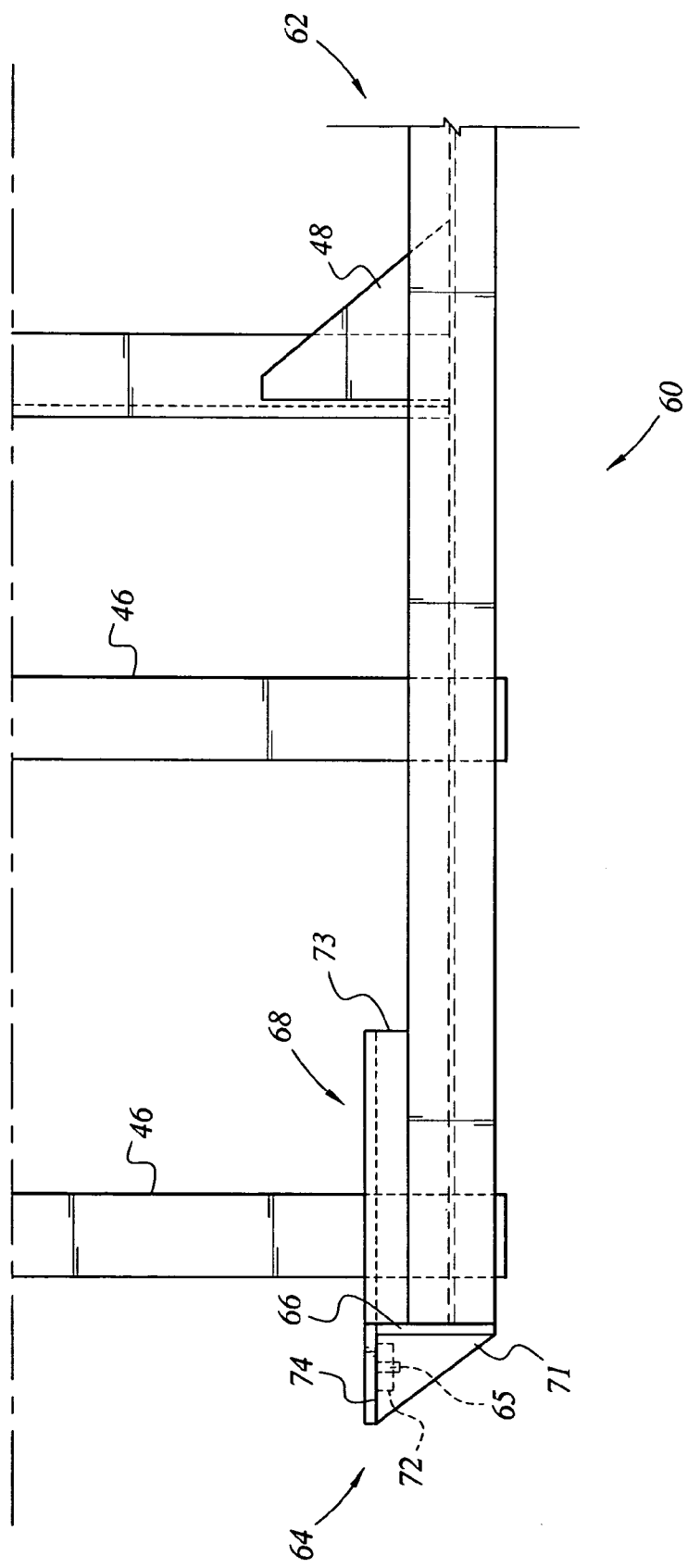
FIG. 6 is a top view of one half of the rear frame assembly of the adjustable length chassis.

FIG. 6 is a top view of one of the main rails 60 of the rear frame assembly 40. Each of the main rails 60 is identical so a discussion of only one of them is necessary. Each main rail 60 has a fixed end 62 and a receiving end 64. An angled end plate 66 is disposed along the receiving end 64 of the main rail 60. A "U" shaped channel bar 68 (also see FIG. 8) is secured to the interior side of the main rail 60 adjacent the receiving end 64 to form a protrusion therealong for receiving the outer side of the "I" frame of the trombone section of gooseneck 30. Angled end plate 66 has upper and lower gussets 71 and a fastening wall 74 upon which is mounted bolt blocks 72 defining upper and lower fastener receiving holes 65 therethrough.

Figure 7:
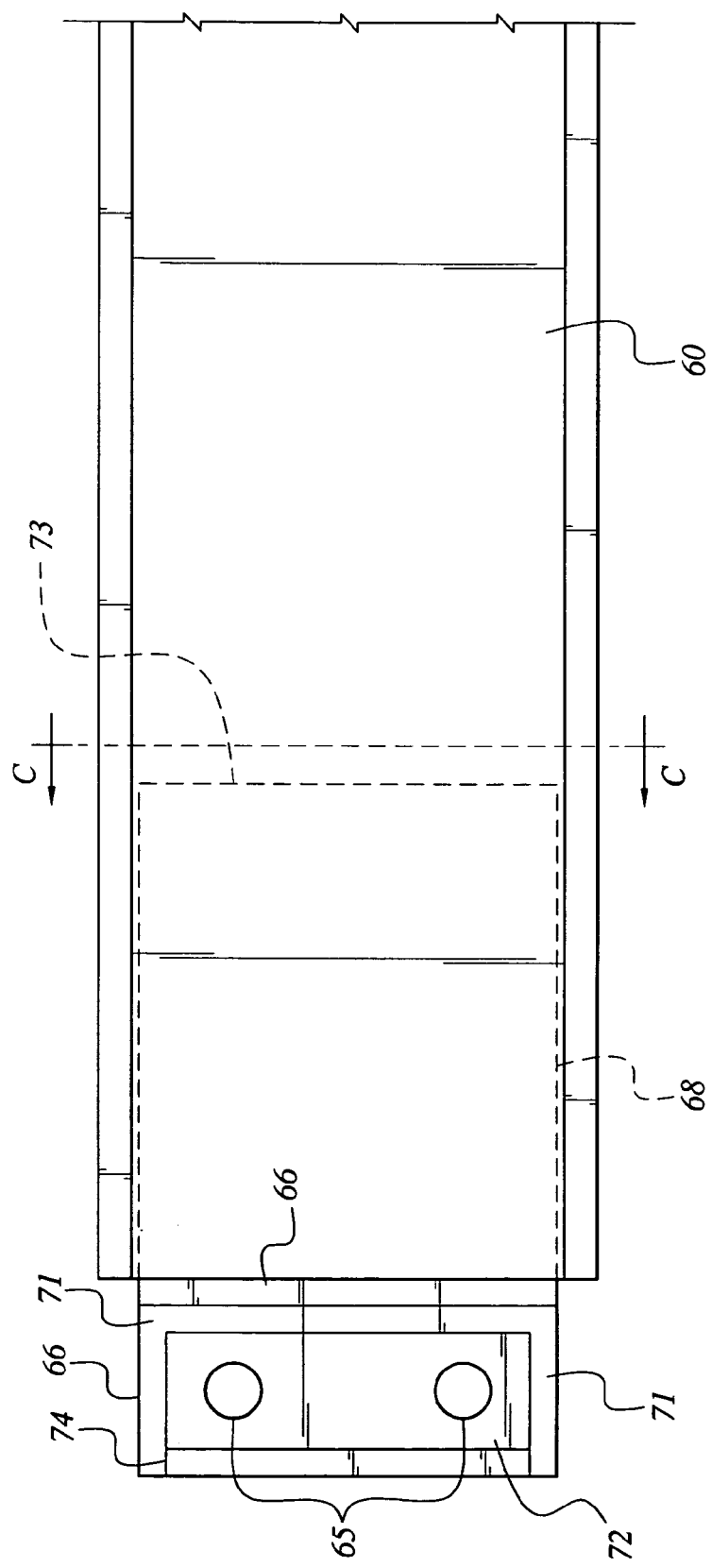
FIG. 7 is a side elevation view of the rear frame assembly.

FIG. 7 is a side elevation view of one of the main rails 60 showing the center channel 68 extending along the rear frame assembly 40. The angled end plate 66 provides a pair of upper and lower fastener receiving holes 65 through bolt blocks 72, angled end plate 66 having upper and lower gussets 71.

Figure 8:
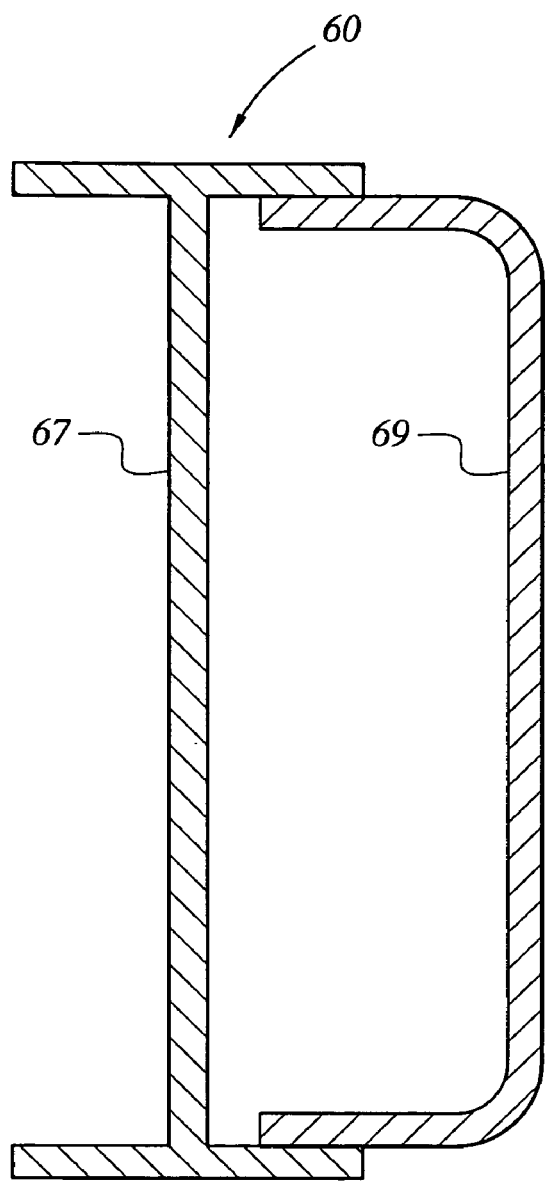
FIG. 8 is a cross sectional view of one of the rails of the rear frame assembly along section C–C' showing the protrusion formed by the "U" section.

FIG. 8 is a cross sectional view of one of the main rails 60 along the line C–C' (as shown in FIG. 7). The cross sectional view depicts the "I" beam cross section 67 of the main rail 60 and the "U" shaped cross section of the channel 69 forming a protrusion therealong. The receiving end 64 of each main rail 60 is equipped with a "U" shaped channel 69 that is welded into the "I" shaped main rail 60 within the upper and lower flanges thereof.

Figure 9:
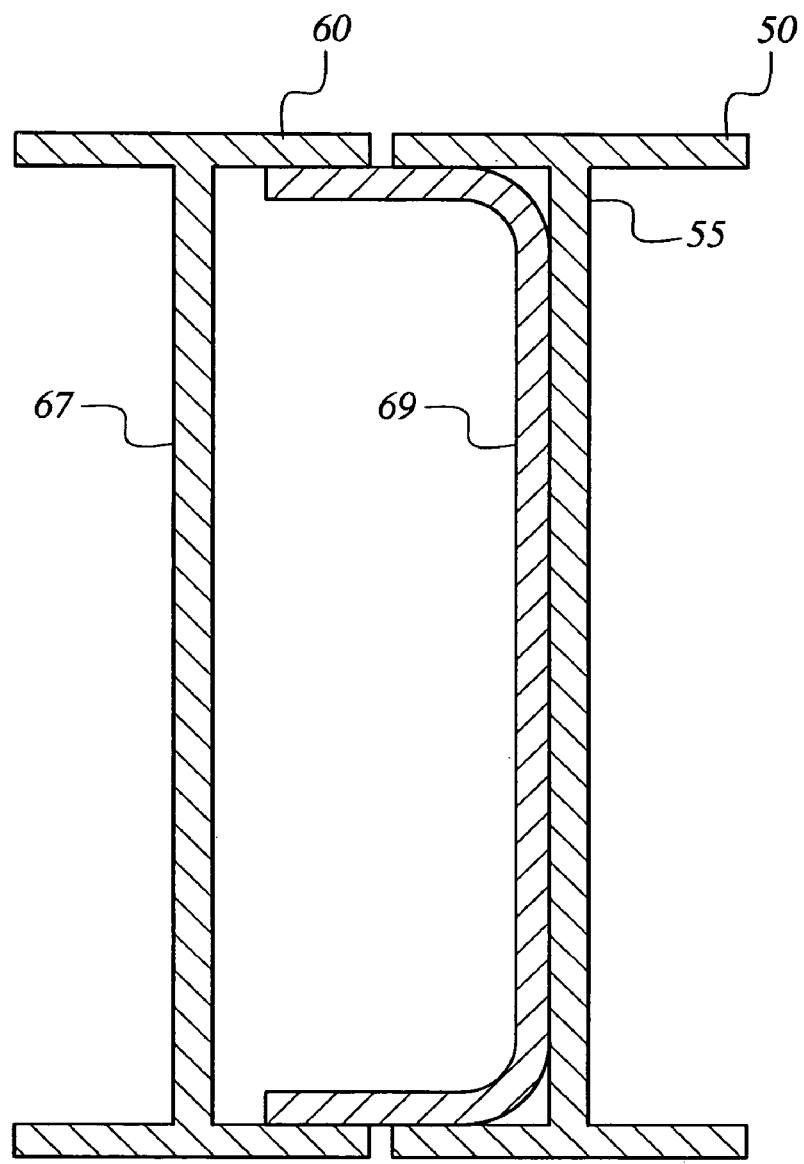
FIG. 9 is a cross sectional view of the adjustable length chassis along section A–A' showing the trombone "I" beam slidingly engaging the protrusion of FIG. 8.

FIG. 9 is a cross sectional view of one half of the chassis 10 along the line A–A' (shown in FIG. 2A). FIG. 9 depicts the "I" beam cross section 55 of a side rail 50 of the gooseneck assembly 30 in relation to the "I" beam cross section 67 of a main rail 60 of the rear frame assembly 40. The side rail 50 slides along the "U" shaped channel bar 69 on the inner side of the protrusion formed by channel 68.

FIG. 10 is a detail side elevation view of the gooseneck trombone portion of the chassis extended as in FIG. 2A and FIG. 11 is a detail side elevation view of the gooseneck trombone portion of the chassis contracted as in FIG. 2B, respectively. As is seen in FIG. 10, connecting bolts 22 are shown in place connecting the side rail 50 of gooseneck assembly 30 with the side rail 60 of rear frame assembly 40 (see FIG. 3). The bolts 22 extend through bolt block 72 of the angled end plate 66 of side main rail 60 of rear frame assembly 40, through the inside wall or "I" portion of the interior portion 52 of side rail 50 of gooseneck assembly 30, and then through bolt block 80 attached to the inner side thereof, bolts 22 passing through fastener receiver or bolt holes 65 (see FIG. 6) and fastener receiver or bolt holes 82 (see FIG. 4A). End plate 73 of central channel 68 (see FIG. 6) abuts stopping plate 70 when the chassis 10 is in the extended and secured position as shown.

As seen in FIG. 11, in the contracted position angle end plate 66 of side main rail 60 of rear frame assembly 40 is moved forward to a point adjacent end plate 53 of side rail 50 of gooseneck 30 (see FIG. 3). The respective upper and lower fastener receivers or bolt holes 65 of end plate 66 and upper and lower bolt holes 82 of inner frame 54 are shown spaced the distance of the contraction of the chassis 10.

In summary, the trombone region 20 of the chassis 10 is where the length reduction of the chassis 10 occurs. The chassis 10 trombones, or reduces its length, by having the gooseneck assembly 30 slide into the rear frame assembly 40. The engaging portion 32 of the gooseneck assembly 30 slideably engages the engaging end 42 of the rear frame assembly 40. The two assemblies 30,40 engage by having the reduced width engaging portion 32 of the gooseneck assembly 30 enter between the receiving end 64 of the main rails 60. The channel 68 in the rear frame assembly 40 creates an open space for receiving the narrow engaging portion 32 of the gooseneck assembly 30. The channel 68 is of sufficient length to allow the gooseneck assembly 30 and the rear frame assembly 40 to slide, one into the other, and reduce the overall length of the chassis by 24 inches to 36 inches.

The chassis 10 is reduced in size to fit inside of the shipping container C the end plate 53 of the gooseneck assembly 30 may contact the angled end plate 66 of the rear frame assembly 40. When the chassis 10 is extended the stopping plate 70 contacts the end of the "U" channels 68 and prevents the gooseneck assembly 30 and the rear frame assembly 40 from completely separating. The upper and lower fastener receiving or bolt holes 65 in the end plate 66 align with the upper and lower fastening receiving or bolt holes 82 in the bolt block 80 of the gooseneck assembly 30. A plurality of upper and lower securing bolts extends through the aligned holes to secure the chassis 10 in its reduced length position(the fastening nuts are not shown).

Finally, in order to allow for the expansion and contraction of the chassis 10, both the air lines and the electrical lines are installed such that they can safely accommodate the changes in length of the chassis.

It is to be understood that the present invention is not limited to the embodiments described above, but encompasses any and all embodiments within the scope of the following claims.

I claim:

1. An adjustable length chassis, comprising:
   a gooseneck first frame portion for supporting a load, having:
      a pair of spaced apart side rails each having an "I" beam cross section defining a non-engaging portion and an engaging portion, the non-engaging portion having a first overall width and the engaging portion having a second overall width that is smaller than the first overall width;

said pair of spaced side rails having an overall length defined by said non-engaging portion at a forward end and said engaging portion at a rear end thereof;

a plurality of cross beams disposed across the spaced apart side rails defining a bed portion for supporting the load;

a rear second frame assembly portion for supporting the load, having:

a pair of spaced apart side main rails each having an "I" shaped cross section, an engaging end portion and a non-engaging end portion, said main rails having an overall length defined by said engaging end portion at a forward end and said non-engaging end portion at a rear end thereof;

a plurality of cross beams disposed across the spaced apart main rails defining a bed portion for supporting the load; and a "U" shaped channel disposed between each of said main rails and forming inward directed protrusions, respectively, each said channel beginning at the engaging end portion of said second frame portion and extending a distance into said second frame portion, said channel being adapted to receive the engaging portion of said first frame portion;

a locking mechanism for releasably securing said first frame portion to said second frame portion; and a stopping plate for preventing said first frame portion from separating from said second frame portion;

said engaging portion of said first frame portion being slideably received over the protrusions formed by the channels in said second frame portion to reduce the overall length of said first frame portion from an extended, locked length to a contracted length to allow the adjustable length chassis to fit inside of a conventional shipping container.

2. The chassis of claim 1, said stopping plate being mounted at said engaging portion rear end of said gooseneck frame portion.

3. The chassis of claim 1, further comprising a landing gear extending downward from said spaced apart side rails of said non-engaging portion of said gooseneck frame portion.

4. The chassis of claim 1, said locking mechanism including angled end plates located on the forward ends of said rear frame portion spaced apart side main rails, respectively, said angled end plates having fastening walls defining upper and lower fastener receiving bores, said pair of spaced side rails of said gooseneck frame portion forming said engaging portion defining upper and lower fastener receiving bores spaced from said rear end thereof by at least the length of said "U" shaped channels and said stopping plate, said locking mechanism further comprising upper and lower bolts removably insertable through said respective upper and lower fastener receiving bores, when aligned, for securing said chassis in an extended length.

5. The chassis of claim 4, further comprising bolt blocks further defining said upper and lower fastener receiving bores located on said fastening walls of said angled end plates and said spaced side rails of said gooseneck frame portion, respectively.

6. The chassis of claim 5, further comprising end plates connecting said non-engaging portion and said engaging portion of said spaced apart side rails of said gooseneck frame portion.

7. The chassis of claim 6, forward travel of said angled end plates of said rear frame portion spaced apart side main rails is limited by said end plates connecting said non-engaging portion and said engaging portion of said spaced apart side rails of said gooseneck frame portion.

8. An adjustable length trailer chassis, comprising:

a gooseneck first frame portion for supporting a load, having:

a pair of spaced apart side rails each having an "I" beam cross section defining a non-engaging portion and an engaging portion, the non-engaging portion having a first overall width and the engaging portion having a second overall width that is smaller than the first overall width;

said pair of spaced side rails having an overall length defined by said non-engaging portion at a forward end and said engaging portion at a rear end thereof;

a plurality of cross beams disposed across the spaced apart side rails defining a bed portion for supporting the load;

a rear second frame assembly portion for supporting the load, having:

a pair of spaced apart side main rails each having an "I" shaped cross section, an engaging end portion and a non-engaging end portion, said main rails having an overall length defined by said engaging end portion at a forward end and said non-engaging end portion at a rear end thereof;

a plurality of cross beams disposed across the spaced apart main rails defining a bed portion for supporting the load; and a "U" shaped channel disposed between each of said main rails and forming inward directed protrusions, respectively, each said channel beginning at the engaging end portion of said second frame portion and extending a distance into said second frame portion, said channel being adapted to receive the engaging portion of said first frame portion;

a locking mechanism for releasably securing said first frame portion to said second frame portion; and a stopping plate for preventing said first frame portion from separating from said second frame portion;

said engaging portion of said first frame portion being slideably received over the protrusions formed by the channels in said second frame portion to reduce the overall length of said first frame portion from an extended, locked length to a contracted length to allow the adjustable length chassis to fit inside of a conventional shipping container;

said locking mechanism including angled end plates located on the forward ends of said rear frame portion spaced apart side main rails, respectively, said angled end plates having fastening walls defining upper and lower fastener receiving bores, said pair of spaced side rails of said gooseneck frame portion forming said engaging portion defining upper and lower fastener receiving bores spaced from said rear end thereof by at least the length of said "U" shaped channels and said stopping plate, said locking mechanism further comprising upper and lower bolts removably insertable through said respective upper and lower fastener receiving bores, when aligned, for securing said chassis in an extended length.

9. The chassis of claim 8, further comprising bolt blocks further defining said upper and lower fastener receiving bores located on said fastening walls of said angled end plates and said spaced side rails of said gooseneck frame portion, respectively.

10. The chassis of claim 9, further comprising end plates connecting said non-engaging portion and said engaging portion of said spaced apart side rails of said gooseneck frame portion.

11. The chassis of claim 10, forward travel of said angled end plates of said rear frame portion spaced apart side main rails is limited by said end plates connecting said non-engaging portion and said engaging portion of said spaced apart side rails of said gooseneck frame portion.

12. An adjustable length chassis for towing behind a tractor, comprising:
   a gooseneck first frame portion for supporting a load, having:
      a pair of spaced apart side rails each having an "I" beam cross section defining a non-engaging portion and an engaging portion, the non-engaging portion having a first overall width and the engaging portion having a second overall width that is smaller than the first overall width;
      said pair of spaced side rails having an overall length defined by said non-engaging portion at a forward end and said engaging portion at a rear end thereof;
      a plurality of cross beams disposed across the spaced apart side rails defining a bed portion for supporting the load;
   a rear second frame assembly portion for supporting the load, having:
      a pair of spaced apart side main rails each having an "I" shaped cross section, an engaging end portion and a non-engaging end portion, said main rails having an overall length defined by said engaging end portion at a forward end and said non-engaging end portion at a rear end thereof;
      a plurality of cross beams disposed across the spaced apart main rails defining a bed portion for supporting the load; and
      a "U" shaped channel disposed between each of said main rails and forming inward directed protrusions, respectively, each said channel beginning at the engaging end portion of said second frame portion and extending a distance into said second frame portion, said channel being adapted to receive the engaging portion of said first frame portion;
   a locking mechanism for releasably securing said first frame portion to said second frame portion; and
   a stopping plate for preventing said first frame portion from separating from said second frame portion;
   said engaging portion of said first frame portion being slideably received over the protrusions formed by the channels in said second frame portion to reduce the overall length of said first frame portion from an extended, locked length to a contracted length to allow the adjustable length chassis to fit inside of a conventional shipping container;
   said locking mechanism including angled end plates located on the forward ends of said rear frame portion spaced apart side main rails, respectively, said angled end plates having fastening walls defining upper and lower fastener receiving bores, said pair of spaced side rails of said gooseneck frame portion forming said engaging portion defining upper and lower fastener receiving bores spaced from said rear end thereof by at least the length of said "U" shaped channels and said stopping plate, said locking mechanism further comprising upper and lower bolts removably insertable through said respective upper and lower fastener receiving bores, when aligned, for securing said chassis in an extended length.

13. The chassis of claim 12, further comprising bolt blocks further defining said upper and lower fastener receiving bores located on said fastening walls of said angled end plates and said spaced side rails of said gooseneck frame portion, respectively.

14. The chassis of claim 13, further comprising end plates connecting said non-engaging portion and said engaging portion of said spaced apart side rails of said gooseneck frame portion.

15. The chassis of claim 14, forward travel of said angled end plates of said rear frame portion spaced apart side main rails is limited by said end plates connecting said non-engaging portion and said engaging portion of said spaced apart side rails of said gooseneck frame portion.

16. The chassis of claim 15, said stopping plate being mounted by welding at said engaging portion rear end of said gooseneck frame portion.

17. The chassis of claim 16, further comprising a landing gear extending downward from said spaced apart side rails of said non-engaging portion of said gooseneck frame portion.

* * * * *